United States Patent Office 3,352,167
Patented Nov. 14, 1967

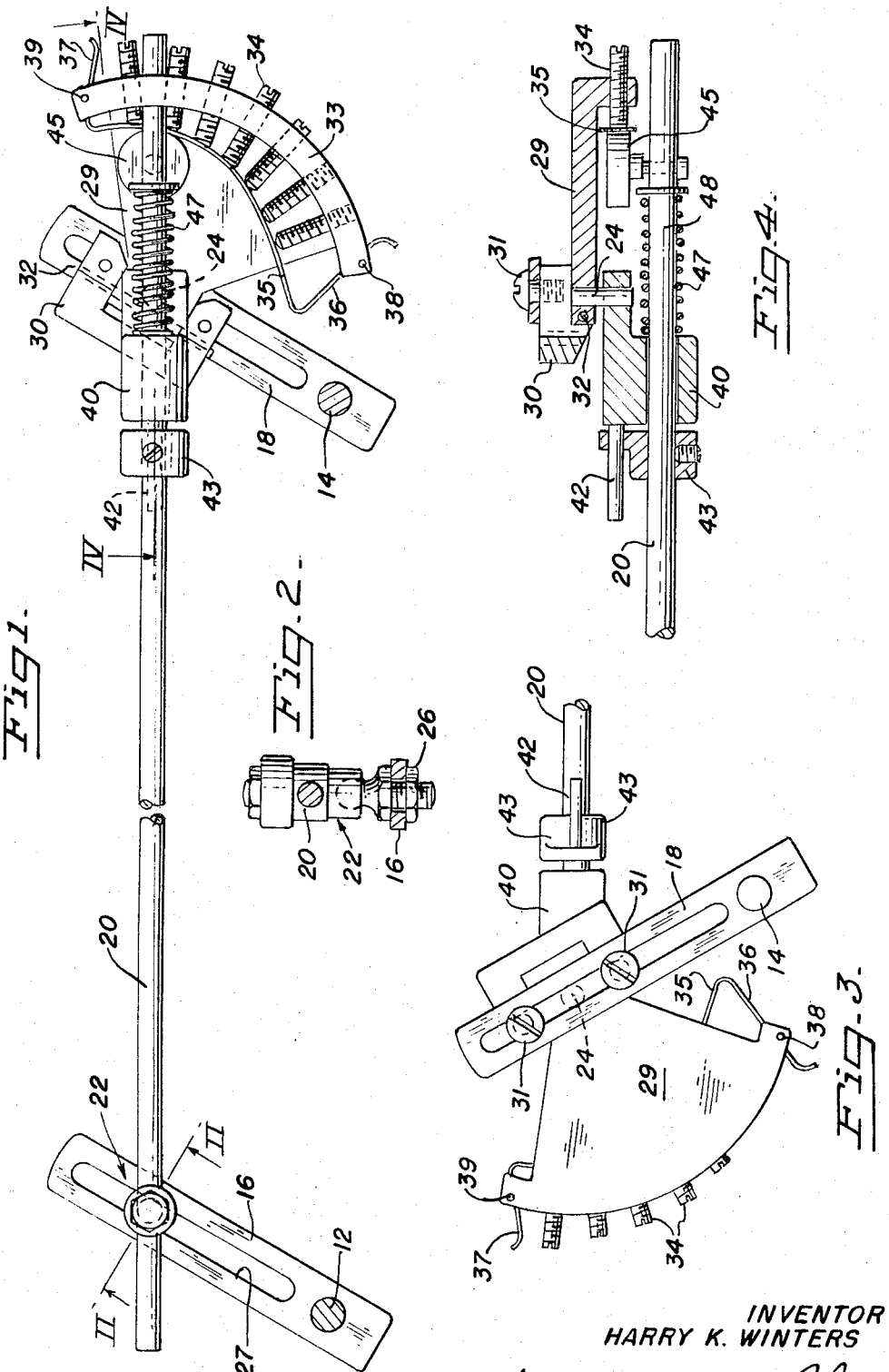

3,352,167
MOTION TRANSMITTING LINKAGE WITH VARIABLE TRANSMISSION MEANS
Harry K. Winters, San Rafael, Calif., assignor to Ray Oil Burner Co., San Francisco, Calif., a corporation of Nevada
Filed Sept. 23, 1965, Ser. No. 489,510
6 Claims. (Cl. 74—96)

ABSTRACT OF THE DISCLOSURE

Linkage used to impart angular motion of one member such as a shaft to similar angular motion to a second member or shaft remote from the first shaft and including means for causing the second shaft to move at a different and variable rate with respect to the first shaft.

---

A typical example of a use for the present invention is found in an oil or gas burner where fuel and air are directed to the burner for combustion. The ratio of fuel and air is critical for good combustion and is preferably caused to remain constant throughout the entire range of flame adjustment from low to high fire. It is desirable to provide linkage between the air and fuel valves so that opening and closing of one will automatically impart like movement to the other. However, since different valves having different opening characteristics are often employed, the movement for operating both valves cannot be the same. Furthermore, the rate of increase and decrease of flow during opening or closing varies with different valves because of their construction. For example, flow through a butterfly valve for air will vary during opening following one curve or pattern while the flow through a globe or other type of valve for oil will vary on a different curve or pattern.

It is the object of the present invention to provide motion transmitting linkage with variable transmission means capable of producing different rates of movement and patterns of movement in two members connected by the linkage.

Further and more specific objects and advantages of the invention and the manner in which the invention is carried into practice are made apparent in the following specification wherein reference is made to the accompanying drawing showing one form of the invention.

In the drawing:
FIG. 1 is a view in elevation of a motion transmitting linkage embodying the present invention;
FIG. 2 is a sectional view taken on the line II—II of FIG. 1;
FIG. 3 is a view in elevation showing the opposite side of a part of the mechanism shown in FIG. 1; and
FIG. 4 is a sectional view taken on the line IV—IV of FIG. 4.

Referring first to FIG. 1 of the drawing, a pair of shafts is shown at 12 and 14. For the purpose of this description, the shafts may be taken as any two shafts which it is desired to move angularly at the same time. For example, they may be the stems of two valves to be opened and closed or they may be simply shafts connected by some other linkage (not shown) to valve opening and closing mechanisms. A conventional way of connecting two such shafts for simultaneous and equal angular movement is to employ levers 16 and 18 fixed against rotation on each of the two shafts and connected together by a rod 20 connected between the levers by pivot joints, one of which is generally indicated at 22 and shown in greater detail in FIG. 2. The pivot shaft on the lever 18 as shown at 24 in FIGS. 1 and 4 and both pivots will presently be described in greater detail. However, with the construction shown and described to this point, it is apparent that rocking movement of either shaft will be transmitted in equal speed and distance to the other shaft.

Variation in the speed and distance of the rocking movement of the shafts can be made by adjusting the position of the pivots 22 and 24 along the length of the levers 16 and 18, this being accomplished by a threaded pin and nut 26 shown in FIG. 2 adjustable lengthwise of the lever in the slot 27. The adjustment of the pivot 24 on the lever 18 will presently be described in detail.

For variations in the curve or pattern of the motion imparted to the shafts 12 and 14 beyond that which may be accomplished by changing the effective length of the levers the present invention provides an improved cam device best shown in FIGS. 1 and 4. This cam device is fixed for swinging movement with the lever and comprises a plate 29 with one end fitting between the legs of a U-shaped bracket 30 and secured in place by a pin 32. The bracket 30 is rigidly fixed to the lever 18 by screws 31. The bracket may be adjusted lengthwise of the lever since the screws pass through slots in the same. The opposite edge of the plate 29 has an arcuate flange 33 with a plurality of set screws threaded therethrough in radial directions as shown at 34. The set screws may be adjusted so that their inner ends provide a cam surface of desired contour and the cam surface is preferably made smooth by the use of a flat spring such as shown at 35 curved to lie adjacent the ends of the set screws and having ends 36 and 37 bent to pass through notches in the ends of the flange 33 where they are held in place by pins shown at 38 and 39, respectively. The pivot 24 previously described as being the pivot between the rod 20 and lever 18 does not form a direct pivotal connection between these elements but as shown in FIG. 4 forms a pivotal connection between the plate 29 and a block 40 through which the rod 20 slides. The block 40 is held against relative rotation with the rod 20 by a pin 42 slidable through a guide block 43 which is secured against rotation on the rod 20. Adjacent the end of the rod, a cam roller 45 is supported for rotation in a position to engage the cam surface spring 35 and it is urged into such engagement by a spring 47 encircling the rod and disposed between the block 40 and a collar 48 on the rod.

Assuming that in operation the shaft 14 is moved in a counterclockwise direction 20°, either manually or by automatic controls such as are commonly used in oil burners, the rod 20 will be moved to the left and will swing the lever 16 to the left tending to rock the shaft 12 through the same 20° arc. However, as the lever 18 moves to the left, it carries with it the plate 29 and cam, the latter engaging the roller 45 to move the rod 20 even further to the left. In this manner the effective length of the rod 20 is varied to increase or decrease the arcuate movement of the lever 16 at a rate depending upon the configuration of the cam surface.

The contour of the cam surface is readily adjustable to compensate for differences in flow pattern of different kinds of valves. Construction of the present invention is such that it may be used in conjunction with existing systems with little or no variation in the systems themselves.

What is claimed is:
1. In linkage for transmitting angular motion from one element to another which comprises a lever fixed on each element and a rod connecting said levers, the improvement which comprises a sliding connection between the rod and one lever, and means fixed to and supported entirely by the other lever and operable upon such angular motion to cause the rod to slide whereby its effective length will vary and the rate of motion of the two levers will vary.

2. The combination of claim 1 in which said means comprises a cam carried by said one lever for movement therewith and positioned to engage the rod.

3. The combination of claim 2 in which the cam comprises a plurality of threadably adjustable elements each having an end aligned with the others to form a cam surface which can be varied by adjustment of said elements.

4. The combination of claim 3 with a smooth flexible element between the aligned ends of said elements and the rod.

5. The combination of claim 4 with a cam roller on the rod for engagement by the cam.

6. The combination of claim 2 in which a spring urges the rod toward contact with the cam.

References Cited

UNITED STATES PATENTS

| 1,833,607 | 11/1931 | Greenfield | 74—568 |
| 2,345,927 | 4/1944 | Foster | 74—568 X |

FOREIGN PATENTS

| 393,182 | 3/1923 | Germany. |
| 746,806 | 1/1945 | Germany. |
| 93,524 | 3/1960 | Netherlands. |

MILTON KAUFMAN, *Primary Examiner.*

FRED C. MATTERN, *Examiner.*

W. S. RATLIFF, *Assistant Examiner.*